No. 877,129. PATENTED JAN. 21, 1908.
S. SCHNEIDER.
BALL GUIDING CASING.
APPLICATION FILED JULY 20, 1907.

WITNESSES:

INVENTOR,
STEFAN SCHNEIDER,
BY
Attorneys.

UNITED STATES PATENT OFFICE.

STEFAN SCHNEIDER, OF CHARLOTTENBURG, GERMANY.

BALL-GUIDING CASING.

No. 877,129.  Specification of Letters Patent.  Patented Jan. 21, 1908.

Application filed July 20, 1907. Serial No. 384,830.

*To all whom it may concern:*

Be it known that I, STEFAN SCHNEIDER, a subject of the Emperor of Germany, and resident of Charlottenburg, Germany, have invented a certain new and useful Improvement in Ball-Guiding Casing, of which the following is a specification.

This invention relates to a ball guiding casing of the kind in which, instead of two cage rings inclosing the ball bearing on both sides, only a single cage ring is used to which the distance pieces are riveted.

In the casing according to the present invention, the distance pieces are formed as U-shaped members fitted separately to the side ring in the manner hereinafter described.

Figure 1:
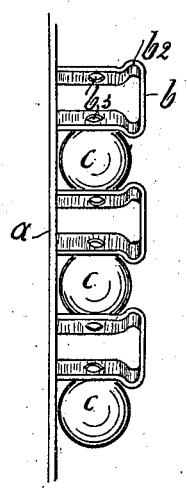
Figure 2:
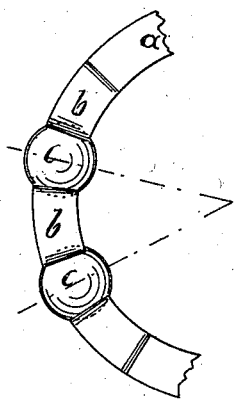
Figure 3:
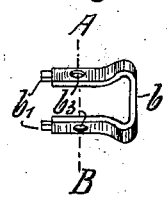
Figure 4:
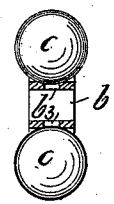

In the drawing, Figure 1 shows a portion of the new ball guiding casing as seen from the outside developed on a plane surface. Fig. 2 is an end elevation part broken away. Fig. 3 shows a detached distance piece. Fig. 4 represents a section on the line A—B of Fig. 3, and two balls in contact with the distance piece.

The cage ring $a$ carries the U-shaped distance pieces $b$ which are passed at the ends $b^1$ through suitable orifices in the ring $a$ and are riveted in position. Between the members $b$ are placed the balls $c$ fitting circular or part-spherical perforations $b^3$ in the limbs of said distance pieces. In this way the casing is supported by the balls free from the shaft and at a constant distance concentrically to the shaft. On the open side of the casing the distance pieces are provided with curved shoulders $b^2$ giving the casing a lateral guidance so that during use the ball guiding casing cannot be moved in lateral direction.

Having now described my invention, what I claim and desire to secure by Letters Patent of the United States is:—

The combination of bearing balls with a ball guiding casing comprising a single cage ring and distance pieces of bulged U shape riveted at their ends to said ring and adapted to project beyond the balls, the bulged portions of said distance pieces being curved to overlap and hold the balls laterally.

In testimony whereof I have signed my name to this specification in the presence of two subscribing witnesses.

STEFAN SCHNEIDER.

Witnesses:
WOLDEMAR HAUPT,
HENRY HASPER.